United States Patent
Eckert et al.

(10) Patent No.: US 7,971,941 B2
(45) Date of Patent: Jul. 5, 2011

(54) MOTORCYCLE BRAKE SYSTEM

(75) Inventors: Alfred Eckert, Mainz-Hechtsheim (DE); Oliver Hoffman, Frankfurt am Main (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 582 days.

(21) Appl. No.: 12/097,062

(22) PCT Filed: Dec. 12, 2006

(86) PCT No.: PCT/EP2006/069613
§ 371 (c)(1),
(2), (4) Date: Jun. 12, 2008

(87) PCT Pub. No.: WO2007/068702
PCT Pub. Date: Jun. 21, 2007

(65) Prior Publication Data
US 2008/0309153 A1    Dec. 18, 2008

(30) Foreign Application Priority Data

Dec. 12, 2005 (DE) .......................... 10 2005 059 659
May 18, 2006 (DE) .......................... 10 2006 023 305

(51) Int. Cl.
*B60T 13/12* (2006.01)
*B60T 13/68* (2006.01)
*B60T 11/10* (2006.01)

(52) U.S. Cl. ...... 303/9.64; 303/9.61; 303/137; 188/345; 188/354; 188/359

(58) Field of Classification Search ............... 188/106 P, 188/344, 345, 354, 358, 359; 303/9.61, 9.64, 303/137

See application file for complete search history.

(56) References Cited

U.S. PATENT DOCUMENTS

| | | | | |
|---|---|---|---|---|
| 6,053,582 A * | 4/2000 | Ganzel | ........................... | 188/358 |
| 6,132,013 A * | 10/2000 | Ganzel | ........................... | 303/139 |
| 7,331,640 B2 * | 2/2008 | Koyama | ........................ | 303/9.64 |
| 2002/0125764 A1 * | 9/2002 | Sakamoto | ..................... | 303/9.63 |
| 2003/0015916 A1 | 1/2003 | Sakamoto | | |
| 2005/0006947 A1 | 1/2005 | Messner | | |
| 2006/0082216 A1 | 4/2006 | Hamm et al. | | |
| 2006/0250022 A1 | 11/2006 | Hasegawa et al. | | |

FOREIGN PATENT DOCUMENTS

| | | |
|---|---|---|
| DE | 102006036383 | 3/2007 |
| JP | 2000071963 A * | 3/2000 |
| WO | 9951477 | 10/1999 |

* cited by examiner

*Primary Examiner* — Thomas J Williams
(74) *Attorney, Agent, or Firm* — Brinks Hofer Gilson & Lione

(57) ABSTRACT

In a dual-circuit hydraulic motorcycle brake system with two hand or foot-operated master cylinders, at the commencement of the pump operation in one of the brake circuits, the change-over valve (20) and/or the separating valve (19) of that brake circuit assume a switching position in which the pressure which can be generated by the pump (9) is prevented from causing a reactive effect on the associated hand-operated or foot-operated master brake cylinder (7, 13). To this end, the separating valve (19) in the brake line may be switched to a closed or throttling position, while the change-over valve (20) in the suction path is closed. Alternatively, both the change-over valve (20) and the separating valve (19) can be opened at the same time so that the pump conveys brake fluid in a circle.

9 Claims, 1 Drawing Sheet

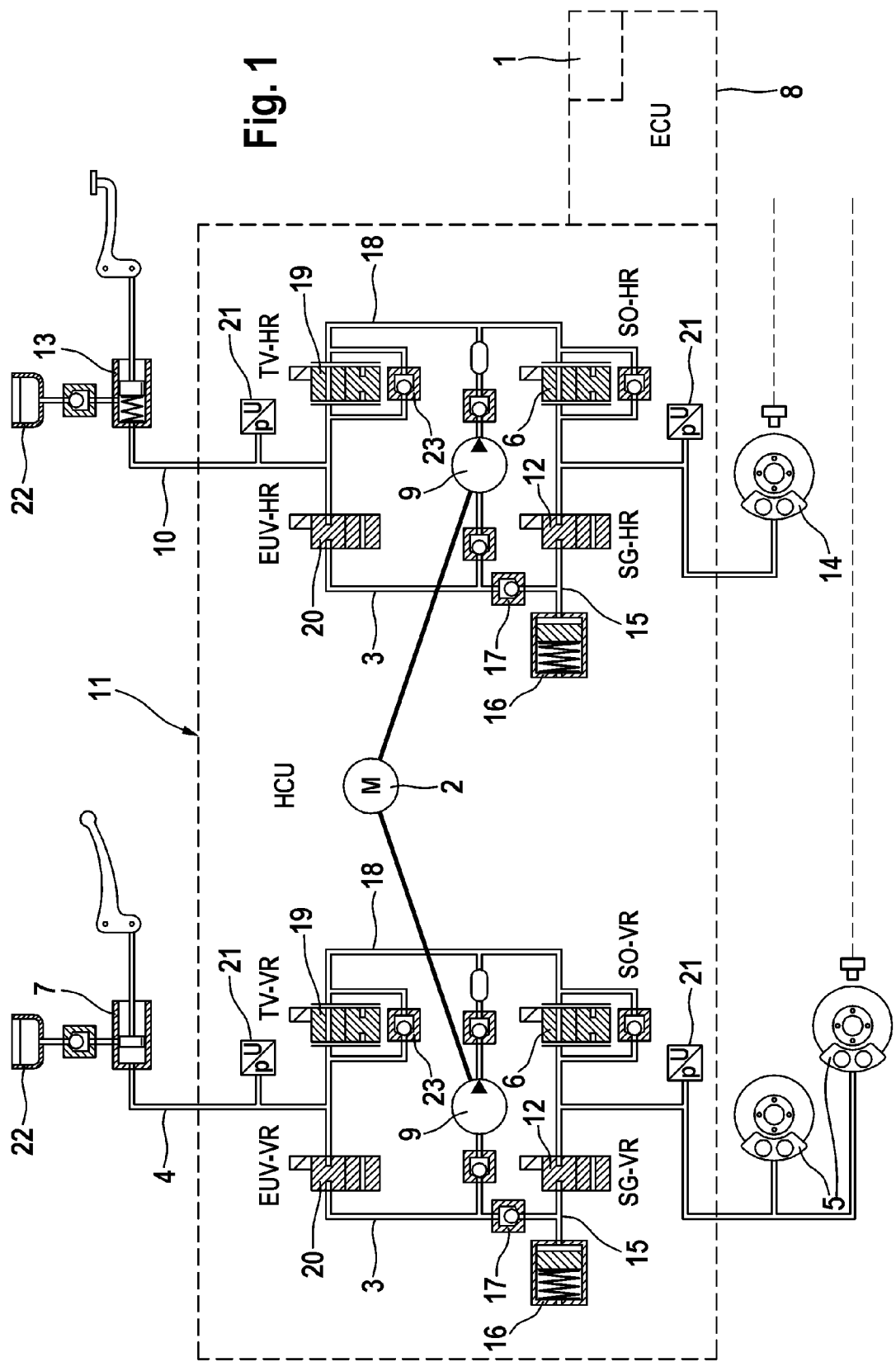

MOTORCYCLE BRAKE SYSTEM

BACKGROUND OF THE INVENTION

The present invention relates to a motorcycle brake system with a first hand-operated or foot-operated master brake cylinder for the hydraulic actuation of a first brake circuit and with a second hand-operated or foot-operated master brake cylinder for the hydraulic actuation of a second brake circuit.

JP 2000071963 A discloses a motorcycle brake system of this type. The brake system includes a hydraulically operable front-wheel and rear-wheel brake circuit in which brake pressure can be built up in the wheel brakes, jointly and independently of each other, by way of a foot-operated and hand-operated master brake cylinder. For brake slip control, electromagnetically activatable inlet and outlet valves and a dual-circuit pump drivable by an electric motor are mounted in the front-wheel and rear-wheel circuits. Furthermore, electrically operable separating valves and change-over valves are provided in the two brake circuits in addition to the inlet and outlet valves and the pump in order to likewise allow building up brake pressure in the brake circuit without manual operation in the event of manual operation of one of the two master brake cylinders, for what purpose the pump and the separating valve and change-over valve in the brake circuit which is not hand-operated are electrically activated.

One shortcoming of this brake system is the reactive effect of the pump pressure on the hand-operated master brake cylinder, with the result that pulsation can be sensed at the hand or foot brake lever of the manually operated master brake cylinder.

In view of the above, an object of the invention is to improve a motorcycle brake system of the type indicated in such a fashion that a reactive effect of the pump pressure on the hand-operated or foot-operated master brake cylinder can be reliably prevented by simplest possible and functionally reliable means.

SUMMARY OF THE INVENTION

This object is achieved for a motorcycle brake system of the indicated type by switching the change-over valve and/or the separating valve into switching positions during the start of the pump, in which positions the valves diminish pressure pulses generated by the pump.

Further features and advantages of the invention can be seen in the subsequent description of an embodiment.

BRIEF DESCRIPTION OF THE DRAWING

FIG. 1 shows a schematic view of the hydraulic circuit with the essential features of the invention for a motorcycle brake system.

DETAILED DESCRIPTION OF THE DRAWINGS

The brake system consists of a hydraulically operable front-wheel and rear-wheel brake circuit 4, 10, with each one master brake cylinder 7 connected to the front-wheel brake circuit 4 and being operable by manual force and a master brake cylinder 13 at the rear-wheel brake 14 that is operable proportionally to leg force.

For brake slip control, electromagnetically operable inlet and outlet valves 6, 12 are arranged in the front-wheel and rear-wheel brake circuits 4, 10, and in each case one inlet valve 6 that is open in its basic position is inserted into the brake conduit of the front-wheel and rear-wheel brake circuits 4, 10, connecting the respectively associated master brake cylinder 7, 13 to the front-wheel or rear-wheel brake 5, 14, by way of the separating valve 19 that is open in the basic position. The outlet valve 12 that is closed in its basic position is respectively inserted into a return conduit 15 of each brake circuit, which connects the front-wheel or rear-wheel brakes 5, 14 to respectively one low-pressure accumulator 16 and the suction path 3 of a dual-circuit pump 9, which operates according to the return principle. On the pressure side, the pump 9 is in connection with the brake conduits 18 of both brake circuits so that, in a brake slip control phase, a return delivery of the brake fluid volume discharged in each case from the front-wheel or rear-wheel brake 5, 14 into the brake conduits 18 of both brake circuits is safeguarded in conformity with requirements. The pump pistons of the two pump circuits are driven jointly by an electric motor 2 so that, without the inventive circuit of the separating and change-over valve 19, 20 that is to be explained in detail in the following, the pulsation of the pump pressure would have an unhindered reactive effect either on the hand-operated brake lever or the foot-operated brake pedal when the pump starts operating.

Corresponding to their design related to circuit technique, both brake circuits 4, 10 are operable jointly and independently of each other, the special feature being that e.g. upon manual operation of the master brake cylinder 7 connected to the front wheel brake circuit 4, not only brake pressure buildup in the front-wheel brake 5 but simultaneously electrohydraulic brake pressure buildup in the rear-wheel brake 14 as well takes place because the electric motor 2 sets pump 9 to operate as soon as, due to the open position of the change-over valve 20 that is electrically initiated in the rear-wheel brake circuit 10, pump 9 takes out pressure fluid from the master brake cylinder 13 and delivers it to the rear-wheel brake 14, while separating valve 19 in the rear-wheel brake circuit 10 separates the pump pressure side from the master brake cylinder 13.

Of course, the above-mentioned example of operation can also be reversed by initiating an electro-hydraulically initiated brake operation at the front-wheel brake 5 is initiated depending on the manual operation of the master brake cylinder 13 connected to the rear-wheel brake 10 according to the same pattern. From this follows that upon operation of one of the two master brake cylinders 7, 13, the brake circuit which is not actuated by the driver becomes pressurized by the dual-circuit pump 9 quasi by electrohydraulic extraneous actuation so that, in the event of single activation of one of the two master brake cylinders, always both brake circuits contribute actively to the brake deceleration.

A pressure sensor 21 is generally used to sense the pressure introduced by the master brake cylinder 7 into the front-wheel brake circuit 4. Likewise monitoring the pressure that is manually introduced into the rear-wheel brake circuit is carried out by means of a pressure sensor 21 arranged close to the master brake cylinder 13. Both brake circuits are additionally provided with two pressure sensors 21 sensing the wheel brake pressure for the analog control of the inlet valves 6.

Upon manual operation of the front-wheel brake circuit 4, the master brake cylinder pressure which is sensed in the front-wheel brake circuit 4 by means of the pressure sensor 21 produces the command variable for the electric activation of the pump 9 that is active in the rear-wheel and front-wheel brake circuit 10, 4, the said pump, in cooperation with the inlet and outlet valves 6, 12, the separating and change-over valves 19, 20, bringing about an automatic brake pressure control in the rear-wheel brake circuit 10 according to an electronic brake-force distribution characteristic curve that is stored in the control unit 8, when exclusively the master brake cylinder 7 connected to the front-wheel brake circuit 4 is actuated.

Similarly hereto applies that, with the exclusive manual operation of the rear-wheel brake circuit 10, the pressure sensor 21 arranged at the master brake cylinder 13 of the rear-wheel brake circuit 4 produces the command variable for the electric activation of the pump 9 mounted in the front-wheel brake circuit 10, as well as the inlet, outlet, change-over and separating valve mounted in the front-wheel brake circuit 10.

To evaluate the pressure sensor signals, a logic circuit is provided in the electronic control unit 8, in which hydraulic pressure is generated by means of the electrically actuatable pump 9 depending on the result of evaluation of the pressure sensor signals.

The symbolically illustrated control unit 8 preferably forms an integral component of a brake unit 11 which includes the front-wheel and rear-wheel brake circuit 4, 10 and is constructed as a monolithic block. In a suitable embodiment, the control unit 8 is plugged onto the inlet and outlet valves 6, 11, change-over and separating valves 20, 19 being integrated in the brake unit 11 for electrical contacting purposes. Thus, the brake unit 11 can be fastened to a motorcycle frame close to a battery due to the especially compact construction.

Principally the following applies to a slip-controlled brake operation:
1. A tendency to lock of the front wheel or rear wheel is reliably detected by means of wheel rotational speed sensors and their signal evaluation in the control unit 8. The inlet valve 6 arranged in the front-wheel or the rear-wheel brake circuit 4, 10 is closed electromagnetically by way of the control unit 8 in order to discontinue further pressure development in the front-wheel or rear-wheel brake circuit 4, 10.
2. Should further pressure decrease be required in addition in the front-wheel or rear-wheel brake circuit 4, 10 in order to reduce the tendency to lock, this is achieved by opening the normally closed outlet valve 12 that is connectible to the low-pressure accumulator 16. The outlet valve 12 is closed as soon as the wheel acceleration re-increases beyond a defined extent. In the pressure decrease phase, the corresponding inlet valve 6 remains closed so that the master brake cylinder pressure generated in the front-wheel or rear-wheel brake circuit 4, 10 cannot propagate to the front-wheel or rear-wheel brake circuit 4, 10.
3. When the slip values found permit new pressure build-up in the front-wheel or rear-wheel brake circuit 4, 10, the inlet valve 6 is opened in a temporally limited manner to comply with the demand of the slip controller integrated in the control unit 8. Pump 9 supplies the hydraulic volume required for pressure build-up.

Irrespective of which one of the two master brake cylinders 7, 13 is operated manually, the invention provides that in the brake circuit which is hand-operated by way of the associated master brake cylinder 7, 13, the change-over valve 20 and/or the separating valve 19 at the beginning of the pump operation assume a switching position in which the pressure that can be generated by the pump 9 is prevented from causing a reactive effect on the hand-operated or foot-operated master brake cylinder 7, 13. Consequently, the separating valve 19 is not only closed in the extraneously actuatable, electrohydraulically operated brake circuit but also in the corresponding hand-operated or foot-operated brake circuit for a comparatively short time.

Therefore, the separating valve 19 assumes either a throttled or even closed switching position in the manually operated brake circuit (manual force or leg force) at the beginning of the pump operation, with the result that the pressure generated by the pump 9 is prevented from causing a reactive effect on the hand-operated or foot-operated master brake cylinder 7, 13 in a simple manner. In addition, also the outlet valve 12 and the change-over valve 20 remain in the closed switching position in the manually operated brake circuit so that the pump 9 at most causes evacuation of the return conduit 15, into which the generally evacuated low-pressure accumulator 16 and a pressure retention valve 18 are mounted downstream.

During the pump operation, the separating valve 19 of the hand-operated or foot-operated brake circuit therefore remains in the throttled or closed switching position for a relatively short time only. This relatively short time corresponds to a small number of delivery strokes, or a corresponding low starting speed of the pump 9, for what reason a measuring device 1 is provided in the control unit 8 to determine the delivery strokes or the starting speed, the measuring signals of said device causing the separating valve 19 to stay in its throttled or closed switching position for a defined time, being energized electromagnetically by the control unit 8 only relatively briefly.

The number of the delivery strokes at which the separating valve 19 in the hand-operated brake circuit adopts its throttled or closed switching position for comfort reasons is in the order between two and 10 piston pump strokes.

Thus, the separating valve 19 of the hand-operated or foot-operated brake circuit, with the start of the pump 9, generally remains in its throttled or closed switching position for an almost constant average time value, and the average time value is determined by the necessary duration of the evacuation of the pump suction path 3 arranged between the pump 9, the closed change-over valve 20 and the outlet valve 12. The preservation of the constant average time value at which the separating valve 19 must stay in its throttled or closed switching position can be realized by means of a timer element integrated in the control unit 8 as an alternative of the mentioned measuring device 1.

In order to prevent a reactive effect of the pressure generated by the pump 9 on the hand-operated or foot-operated master brake cylinder 7, 13 at the commencement of deceleration, it is now suggested as an alternative to the closed or throttled position of the separating valve 19 to short-circuit the pump suction side with the pump pressure side by way of the change-over valve 20 and the separating valve 19, for what purpose both the change-over valve 20 and the separating valve 19 assume their open switching position.

The existing problem of preventing the reactive effect of the pump pressure on the operated hand or foot brake lever at the beginning of brake application can thus be effectively prevented at the beginning of the pump operation either by means of a pump short-circuit or solely by throttling or closing the separating valve 19.

As can be seen in the FIGURE, the separating valve 19 that is open in its basic position, the change-over valve 20 that is closed in its basic position, the inlet valve 6 that is open in its basic position and the outlet valve 12 that is closed in its basic position are configured as an electrically operable two-way/two-position directional control valve, the valves remaining in their illustrated basic position by a spring in a most simple fashion. Furthermore, a non-return valve 23 opening in the direction of the wheel brake 5, 14 is arranged in parallel to each of the two separating valves 19, with the result that irrespective of the position of the separating valve, brake pressure can be introduced manually at any time by way of the connected master brake cylinder 7, 13, and namely irrespective of whether an electrohydraulically controlled brake operation will take place in one of the two brake circuits.

LIST OF REFERENCE NUMERALS

1 measuring device
2 electric motor
3 pump suction path
4 front-wheel brake circuit
5 front-wheel brake
6 inlet valve
7 master brake cylinder
8 control unit
9 pump
10 rear-wheel brake circuit
11 brake unit
12 outlet valve
13 master brake cylinder
14 rear-wheel brake
15 return conduit
16 low-pressure accumulator
17 pressure retention valve
18 brake conduit
19 separating valve
20 change-over valve
21 pressure sensor
22 supply reservoir
23 non-return valve

The invention claimed is:

1. A motorcycle brake system comprising a hand-operated or foot-operated first master brake cylinder for a hydraulic actuation of a first brake circuit and with a hand-operated or foot-operated second master brake cylinder for a hydraulic actuation of a second brake circuit, the brake system further comprising an inlet and an outlet valve provided for brake slip control in each wheel brake of each brake circuit, a low-pressure accumulator arranged in each of the two brake circuits and being connected in each case downstream of the outlet valve to a return conduit, a pump with a suction side and a pressure side, the suction side being connected to the return conduit and the pressure side being connected to the respective associated brake circuit, the brake system further comprising a separating valve in each brake circuit which, in an open position, connects the associated master brake cylinder to the pump pressure side, and a change-over valve in a suction path of each brake circuit, which change-over valve, in an open position, connects the associated master brake cylinder to the suction side of the pump, wherein, at the beginning of a pump operation in one of the two brake circuits, the change-over valve (20) and the separating valve (19) associated with the brake circuit assume switching positions in which a reactive effect of pressure pulses generated by the pump (9) on the associated master brake cylinder (7, 13) is diminished, wherein the change-over valve (20) assumes a closed switching position during the operation of the pump in the associated brake circuit.

2. The motorcycle brake system as claimed in claim 1, wherein the associated separating valve (19) assumes a throttled or a closed switching position in the associated brake circuit at the beginning of the pump operation.

3. The motorcycle brake system as claimed in claim 2, wherein a measuring device (1) is provided to detect the pump operation, and wherein the associated separating valve (19), remains in the throttled or the closed switching position for a time corresponding to two to ten pump delivery strokes.

4. The motorcycle brake system as claimed in claim 3, wherein the measuring device counts the pump delivery strokes and the the separating valve assumes the throttled or closed switching position until the measuring device has counted between two and ten of the pump delivery strokes.

5. The motorcycle brake system as claimed in claim 3, wherein the measuring device measures an operating speed of the pump and the separating valve (19) assumes the throttled or the closed switching position until the pump (9) has reached a threshold operating speed.

6. The motorcycle brake system as claimed claim 2, wherein, when the pump starts operating, the separating valve (19) of the associated brake circuit remains in the throttled or the closed switching position for a constant average time value, the average time value being determined by the average time required by the pump to evacuate the suction path (3) between the change-over valve and the suction side of the pump, while the change-over valve is closed.

7. The motorcycle brake system as claimed in claim 2, wherein the separating valve (19) is electrically actuated to assume the throttled or the closed switching position for a constant time.

8. The motorcycle brake system as claimed in claim 1, wherein the pump suction side is connected to the pump pressure side at the beginning of the pump operation.

9. The motorcycle brake system as claimed in claim 8, wherein the change-over valve (20) and the separating valve (19) simultaneously assume the open position.

\* \* \* \* \*